G. E. SLOCUM.
MOTOR CONTROL SYSTEM.
APPLICATION FILED JAN. 26, 1917.
1,363,681.
Patented Dec. 28, 1920.
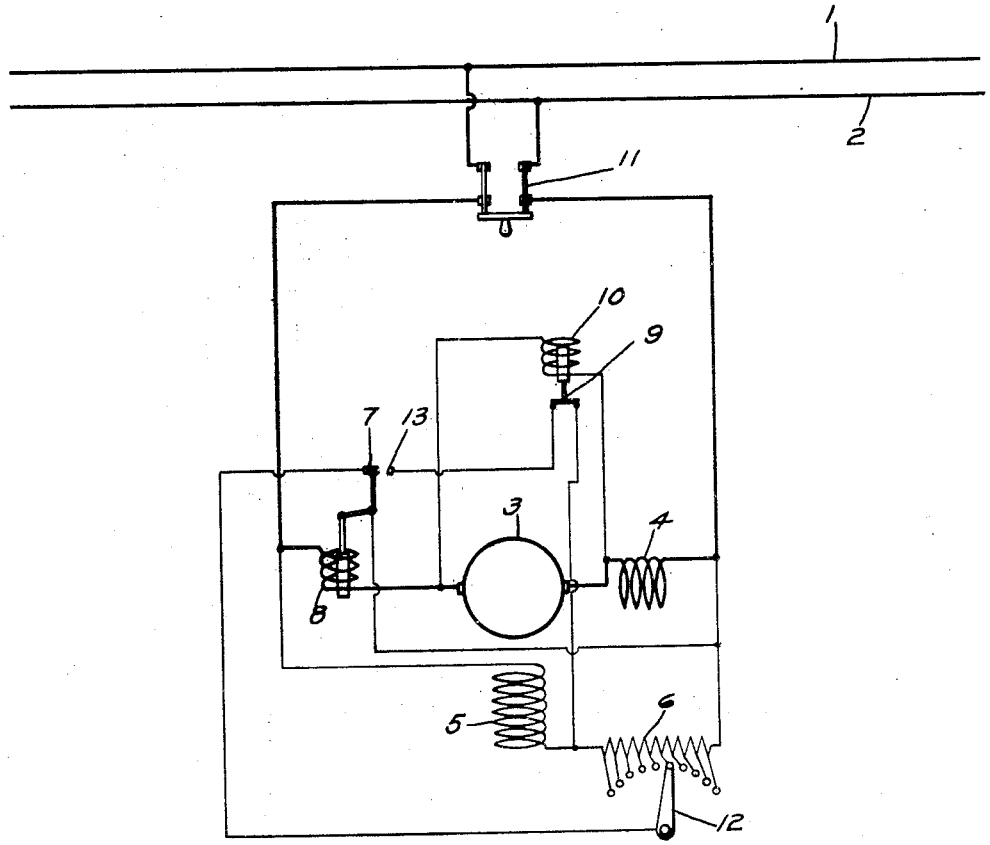
WITNESSES:
William Siler.
J. R. Langley.
INVENTOR
George E. Slocum
BY
Wesley G. Sloan
ATTORNEY

UNITED STATES PATENT OFFICE.

GEORGE E. SLOCUM, OF CLEVELAND, OHIO, ASSIGNOR TO WESTINGHOUSE ELECTRIC AND MANUFACTURING COMPANY, A CORPORATION OF PENNSYLVANIA.

MOTOR-CONTROL SYSTEM 1,363,681.      Specification of Letters Patent.      Patented Dec. 28, 1920.

Application filed January 26, 1917. Serial No. 144,670.

*To all whom it may concern:*

Be it known that I, GEORGE E. SLOCUM, a citizen of the United States, and a resident of Cleveland, in the county of Cuyahoga and State of Ohio, have invented a new and useful Improvement in Motor-Control Systems, of which the following is a specification.

My invention relates to motor-control systems and particularly to such systems as embody current-limit devices for automatically controlling the field strength of electric motors during variations in speeds.

My invention has for its object to provide means for controlling the effect of the operation of current-limit devices for controlling the field strengths of electric motors during the deceleration of the motors.

It is more or less common practice to employ current-limit devices of the type known as fluttering relays for automatically controlling resistors in circuit with the shunt field-magnet windings of electric motors during the period of acceleration. Such devices operate satisfactorily when the dynamo-electric machines in connection with which they are employed operate as motors, since they are arranged to strengthen the fields in case the currents traversing the motor circuits exceed predetermined values.

In case the field rheostat of a motor is adjusted, manually or otherwise, to strengthen the field and thereby effect a decrease in the speed of the motor, the latter operates as a generator to return energy to the line or to energize a dynamic braking circuit. If the motor is operating at its normal speed and its field is strengthened to a considerable degree, the electromotive force generated by the motor exceeds that of the source of supply and the current traversing its circuit may be relatively high. Under these conditions, the fluttering relay would operate, as in the acceleration of the motor, to further strengthen the field by shunting the entire field resistor. Such operation is the reverse of that required to correct the abnormal conditions, and it is desirable to prevent the operation of the fluttering relay to produce the conditions described above.

I arrange the fluttering relay in such manner that it operates to shunt the entire field resistor when the current traversing the motor circuit exceeds a predetermined value. This operation is secured by providing the relay with a coil that is in series-circuit relation to the motor armature. In the normal position of the fluttering relay, a shunt circuit is established for such portion of the field resistor as in included between one of its terminals and the point to which the movable arm of the rheostat is connected. The rheostat arm may occupy any desired intermediate position, according to the speed at which it is desired to operate the motor. The circuit for shunting the entire resistor is controlled by a relay having an actuating coil connected across the terminals of the motor armature. The latter relay operates, therefore, in accordance with the electromotive force generated by the motor armature.

During the period of acceleration, the counter-electromotive force of the motor does not exceed that of the source of energy and the counter-electromotive force relay does not operate to render the fluttering relay ineffective to shunt the field resistor. If, however, the motor is operating at its normal speed and the field resistor is adjusted to strengthen the field of the motor and thereby reduce its speed, the electromotive force generated by the motor armature may exceed that of the source of supply and cause a relatively heavy current to traverse the motor circuit. The counter-electromotive-force relay then opens and the fluttering relay is rendered ineffective to establish a shunt circuit for the field resistor and thus further increase the abnormal electromotive force of the motor armature.

In the accompanying drawing, the single figure is a diagrammatic view of circuits and apparatus embodying my invention.

Line conductors 1 and 2 supply energy to an electric motor, the armature of which is indicated at 3 and which has a series field-magnet winding 4 and a shunt field-magnet winding 5. A resistor 6, which may be the usual field rheostat, is in series-circuit relation to the shunt field-magnet winding 5. A shunt circuit for the resistor 6 is controlled by a relay 7 having an actuating coil 8 that is in series-circuit relation to the motor armature. A relay 9, which is included in the circuit for shunting the resistor 6, has an actuating coil 10 that is connected across the terminals of the motor armature.

It may be assumed that the line switch 11 has been closed and that the movable arm 12 of the field rheostat has been adjusted to its illustrative position to shunt only that portion of the resistor 6 which is included between the terminal connected to the movable member of the relay 7 and the contact member which is engaged by the movable arm 12. The relay 7 occupies its illustrated position when the current traversing the motor circuit is below a predetermined value.

In case the field of the motor has been weakened at a rate exceeding that of its increase in speed, the current traversing the motor armature and the relay coil 8 may exceed the predetermined value at which the relay 7 is adjusted to operate. In such case, the relay 7 engages contact member 13 to complete a shunt circuit for the resistor 6 which includes the relay 9.

The resultant strengthening of the motor field causes an increase in the counter-electromotive force of the motor and a corresponding decrease in the current traversing its circuit. The relay 7 assumes its illustrated position when the current falls to the predetermined value. The vibration of the relay 7 continues until the motor has reached the speed corresponding to the adjustment of the rheostat arm 12, whereupon it remains in its normal position to shunt that portion of the resistor 6 determined by the position of the rheostat arm 12 as previously described.

In case it is desired to decrease the speed of the motor, the rheostat arm is adjusted to the left, as viewed in the drawing, to shunt a greater portion of the resistor 6 and thereby strengthen the field of the motor. In case the motor is operating at a relatively high speed and the field is strengthened to a considerable degree, the current traversing the generator circuit may have a sufficiently high value to effect the operation of the relay 7 to engage the contact member 13. The operation of the relay is rendered ineffective to shunt the resistor 6, however, by the operation of relay 9 to open the circuit controlled by it so long as the electromotive force generated by the motor armature exceeds a predetermined value which is substantially equal to that of the line voltage.

The operation of the relay 7 under the conditions described above has the effect of inserting the entire resistor 6 in series with the field-magnet winding 5 and thereby causing a material weakening of the motor field. When the current traversing the motor circuit falls below the predetermined value at which the relay 7 is actuated, it assumes its normal position to again shunt such portion of the resistor 6 as is included between the arm 12 and the terminal to which the relay 7 is connected. The field is again strengthened and the current traversing the main circuit may again exceed the predetermined value at which the relay is actuated. The vibration of the relay 7 continues so long as the counter-electromotive force of the motor exceeds the value at which the relay 9 operates and the current traversing the main circuit is sufficiently heavy to operate the relay 7. The motor is thus brought to rest gradually and smoothly.

By means of the arrangement above described, I am able to prevent the operation of means for automatically controlling the field excitation of electric motors to increase the abnormal conditions obtaining during the operation of the motor as a generator during the period of deceleration. While I have shown and described such preventing means as may be controlled automatically in accordance with the electromotive force of the motor armature, it is understood that equivalent means may be substituted therefor. For example, it will be apparent that, when the counter-electromotive force of the motor is relatively high, current traverses the motor circuit in the reverse direction and this condition may be utilized to produce substantially the same results. Under certain conditions during deceleration of the motor, the automatic controlling means operates to produce effects which are the reverse of those caused during the acceleration of the motor. Thus, the field excitation of the motor is automatically controlled to effect a gradual change in speed both during acceleration and deceleration of the motor without danger of excessive currents.

I claim as my invention:

1. In a motor-control system, the combination with an electric motor having a field-magnet winding and a resistor in circuit therewith, of a current-limit device for controlling said resistor, and means for rendering said device ineffective when the counter-electromotive force of said motor exceeds a predetermined value.

2. In a motor-control system, the combination with an electric motor having a field-magnet winding and a resistor in circuit therewith, of a current-limit device for controlling said resistor, and means controlled by the counter-electromotive force of said motor for rendering said device ineffective to shunt said resistor.

3. In a motor-control system, the combination with an electric motor having a field-magnet winding and a resistor in circuit therewith, of a current-limit device for controlling said resistor, and a relay having an actuating coil in shunt relation to the motor armature for controlling the effect of the operation of said device.

4. In a motor-control system, the combination with an electric motor having a field-magnet winding and a resistor in circuit therewith, of means for automatically shunting said resistor when the current traversing the motor circuit exceeds a predetermined value, and means controlled by the voltage across the terminals of the motor armature for controlling the effect of the operation of said automatic means.

5. In a motor-control system, the combination with an electric motor having a field-magnet winding and a resistor in circuit therewith, of means for automatically shunting said resistor when the current traversing the motor circuit exceeds a predetermined value, and means for preventing the shunting of said resistor when the counter-electromotive force of said motor exceeds a predetermined value.

6. In a motor-control system, the combination with an electric motor having a field-magnet winding and a resistor in circuit therewith, of means for automatically shunting said resistor when the current traversing the motor circuit exceeds a predetermined value during the acceleration of said motor, and means for preventing the shunting of said resistor during the deceleration of said motor when the electromotive force generated by the motor armature exceeds a predetermined value.

7. In a motor-control system, the combination with an electric motor having a field-magnet winding and a resistor in circuit with said winding, of a current-limit device for controlling said resistor having one position in which all of said resistor is shunted and a second position in which a selected portion of said resistor is shunted, and means for rendering said device ineffective in one of its positions.

8. In a motor-control system, the combination with an electric motor having a field-magnet winding and a resistor in circuit with said winding, of a current-limit device for controlling said resistor having one position in which all of said resistor is shunted and a second position in which a selected portion of said resistor is shunted, and means for rendering said device ineffective in its said one position.

9. In a motor-control system, the combination with an electric motor having a field-magnet winding and a resistor in circuit with said winding, of a current-limit device for controlling said resistor having one position in which all of said resistor is shunted and a second position in which a selected portion of said resistor is shunted, and means for rendering said device ineffective in its said one position when the counter-electromotive force of said motor exceeds a predetermined value.

10. The combination with an electric motor having a field-magnet winding and a resistor in circuit therewith, of means for normally maintaining a portion of said resistor in circuit with said winding and for short-circuiting said portion under predetermined conditions during the acceleration of said motor, and for normally maintaining said portion in circuit with said winding and for inserting said whole resistor into circuit with said winding under predetermined conditions during the deceleration of said motor.

11. In a motor-control system, the combination with an electric motor having a field-magnet winding and a resistor in circuit therewith, of a normally closed switch for short-circuiting said resistor adapted to be opened when said motor operates as a generator, and an electric circuit independent of said switch for short-circuiting a portion of said resistor.

12. In a motor-control system, the combination with an electric motor having a field-magnet winding and a resistor in circuit therewith, of a two-position switch and a pair of electric circuits for controlling said resistor, said switch being adapted to close one of said circuits to short-circuit a portion of said resistor when said switch occupies one of its two positions and to close said other circuit to short-circuit the whole resistor when it occupies the other of its two positions.

13. In a motor-control system, the combination with an electric motor having a field-magnet winding and a resistor in circuit therewith, of a pair of switches for alternately short-circuiting a portion of said resistor and the whole resistor, each of said switches having a single actuating coil.

14. In a motor-control system, the combination with an electric motor having a field-magnet winding and a resistor in circuit therewith, of a pair of switches, one of said switches having a single actuating coil in parallel circuit with the armature of said motor and said other switch having an actuating coil in series with said armature, said other switch being adapted to occupy two positions, in each of which positions it closes a circuit for controlling said resistor.

In testimony whereof, I have hereunto subscribed my name this eighteenth day of January, 1917.

GEORGE E. SLOCUM.